(12) United States Patent
Uhlig

(10) Patent No.: US 8,743,406 B1
(45) Date of Patent: *Jun. 3, 2014

(54) SPECIFYING, PRODUCING, AND DELIVERING VARIABLE-CONTENT DOCUMENTS

(71) Applicant: Uhlig LLC, Overland Park, KS (US)

(72) Inventor: Mark A. Uhlig, Leawood, KS (US)

(73) Assignee: Uhlig LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/904,307

(22) Filed: May 29, 2013

Related U.S. Application Data

(63) Continuation of application No. 12/344,137, filed on Dec. 24, 2008, now Pat. No. 8,462,371.

(60) Provisional application No. 61/017,476, filed on Dec. 28, 2007.

(51) Int. Cl.
*G06F 15/00* (2006.01)

(52) U.S. Cl.
USPC ................................................. 358/1.15

(58) Field of Classification Search
USPC ..................................................... 358/1.14
See application file for complete search history.

(56) References Cited

U.S. PATENT DOCUMENTS

| | | | |
|---|---|---|---|
| 5,058,030 A | 10/1991 | Schumacher | |
| 5,060,165 A | 10/1991 | Schumacher et al. | |
| 5,742,932 A | 4/1998 | Levitsky | |
| 5,918,220 A | 6/1999 | Sansone et al. | |
| 6,697,843 B1 | 2/2004 | Carlin et al. | |
| 6,807,459 B2 | 10/2004 | Rosenbaum et al. | |
| 8,462,371 B1 | 6/2013 | Uhlig | |
| 2005/0198238 A1 | 9/2005 | Sim et al. | |
| 2008/0086369 A1* | 4/2008 | Kiat et al. | ........................ 705/14 |

OTHER PUBLICATIONS

"About iPrint.com—Business Printing Made Easy®!" iPrint.com®, 1996-2011, 1 page, [Online] [Retrieved on Mar. 31, 2011] Retrieved from the Internet <URL: http://www.iprint.com/cgi-shl/page_gen.cgi?sID=2011033111/7960292b151afedd56f-1&raw=aboutus%2Faboutiprint>.

Archive of "Business Process Outsourcing," Group 1 Software, Jan. 2006, [Online] [Archived by http://archive.org on Feb. 6, 2007; Retrieved on Sep. 27, 2010] Retrieved from the Internet <URL: http://web.archive.org/web/20070206124441/http://www.g1.com/PDF/About/BPO.pdf>.

(Continued)

*Primary Examiner* — Saeid Ebrahimi Dehkordy
(74) *Attorney, Agent, or Firm* — Fenwick & West LLP

(57) ABSTRACT

Systems, methods, and computer program products are presented for creating and distributing a document of a particular type, where the document is based on variable content and/or variable layout. In one embodiment, a four-step is process is used. First, the document is specified. The document can be specified anywhere, regardless of the location of the user's office or the destination address of the document. In one embodiment, the document is specified using a client device (e.g., a computer running a web browser) that is attached to a network (e.g., the Internet). Second, the specification is transmitted to a production facility based on the destination address. Third, the document is produced at the facility. Finally, the produced document is delivered to the destination address.

20 Claims, 1 Drawing Sheet

(56) References Cited

OTHER PUBLICATIONS

Archive of "Customer Communication Management," Group 1 Software, 2007, [Online] [Archived by http://archive.org on Nov. 22, 2007; Retrieved on Sep. 27, 2010] Retrieved from the Internet <URL: http://web.archive.org/web/20071122011542/http://www.g1.com/About/G1PB/CCM/>.

Archive of "DOC 1® Interactive," Group 1 Software, Aug. 2004, [Online] [Archived by http://archive.org on Feb. 21, 2007; Retrieved on Sep. 27, 2010] Retrieved from the Internet <URL: http://web.archive.org/web/20070221105624/http://www.g1.com/PDF/Product/DOC1Interactive.pdf>.

Archive of "Document Composition Products," Group 1 Software, 2007, [Online] [Archived by http://archive.org on Dec. 1, 2007; Retrieved on Sep. 27, 2010] Retrieved from the Internet <URL: http://web.archive.org/web/20071201225106/http://www.g1.com/Products/Document-Composition/>.

Archive of G1.com, Group 1 Software, 2007, [Online] [Archived by http://archive.org on Dec. 23, 2007; Retrieved on Sep. 27, 2010] Retrieved from the Internet <URL: http://web.archive.org/web/20071223182631/http://www.g1.com/>.

Archive of "Printsoft Solutions: Hybrid Mail Solutions," PrintSoft, 2006, [Online] [Archived by http://archive.org on Dec. 20, 2007; Retrieved on Sep. 27, 2010] Retrieved from the Internet <URL: http://web.archive.org/web/20071220230659/http://www.printsoft.com.au/solutions/hybridmail.htm>.

Archive of "StreamWeaver® Print Stream Engineering Solution," Group 1 Software, Mar. 2005, [Online] [Archived by http://archive.org on Feb. 21, 2007; Retrieved on Sep. 27, 2010] Retrieved from the Internet <URL: http://web.archive.org/web/20070221184144/http://www.g1.com/PDF/Product/StreamWeaver.pdf>.

Archive of "VistaPrint Company Facts," VistaPrint, 2001-2007, [Online] [Archived by http://archive.org on Oct. 11, 2007; Retrieved on Mar. 31, 2011] Retrieved from the Internet <URL: http://replay.waybackmachine.org/20071011103801/http://www.vistaprint.com/vp/ns/about/CompanyFAQ.aspx?xnav=LeftItem&xnid=MediaResources&dng=1021357&dr=1>.

"Customer Communication Management," Pitney Bowes Software, Inc., 2009, 8 pages, [Online] [Retrieved on Mar. 31, 2011] Retrieved from the Internet <URL: http://www.pbinsight.com/files/resource-library/resource-files/CCM-Brochure.pdf>.

"DOC1 for OnDemand Communications," Pitney Bowes Software, Inc., 2011, 1 page, [Online] [Retrieved on Mar. 31, 2011] Retrieved from the Internet <URL: http://www.pbinsight.com/products/customer-communication-mgmt/document-comp/ondemand-comms/doc1-1/>.

"Hybrid Mail (HMS)," Elsag Datamat, 1 page, [Online] [Retrieved on Sep. 7, 2010] Retrieved from the Internet <URL: http://postalautomation.elsag.it/HybridMail.htm>.

"Inner Workings™," InnerWorkings, Inc., 1 page, [Online] [Retrieved on Sep. 7, 2010] Retrieved from the Internet <URL: http://www.dfms.com/> (redirects to http://www.inwk.com/).

"iPrint®—Company Profile," iPrint.com®, 1996-2011, 1 page, [Online] [Retrieved on Mar. 31, 2011] Retrieved from the Internet <URL: http://www.iprint.com/cgi-shl/page_gen.cgi?sID=2011033113/062f2b2e1e1b3c39257-2&raw=aboutus%2Fcompprofile>.

Kady, M., "UPS's $100M Delivery," Washington Business Journal, May 25, 2001, 2 pages, [Online] [Retrieved on Sep. 27, 2010] Retrieved from the Internet <URL: http://washington.bizjournals.com/washington/stories/2001/05/28/story1.html>.

"OnDemand Communications," Pitney Bowes Software, Inc., 2011, 1 page, [Online] [Retrieved on Mar. 31, 2011] Retrieved from the Internet <URL: http://www.pbinsight.com/products/customer-communication-mgmt/document-comp/ondemand-comms/>.

"Patent and Trademark Information," iPrint.com®, 1996-2011, 1 page, [Online] [Retrieved on Mar. 31, 2011] Retrieved from the Internet <URL: http://www.iprint.com/cgi-shl/page_gen.cgi?sID=2011033113/062d242b1016c8609c9-2&raw=aboutus%2Fpantinfo>.

"Postal Service Announces Certified Mail Online New Offering Joins Suite of Hybrid Services," United States Postal Service®, Mar. 26, 2001, 1 page, [Online] [Retrieved on Sep. 27, 2010] Retrieved from the Internet <URL: http://www.usps.com/news/2001/press/pr01_027.htm>.

"Products and Services," iPrint.com®, 1996-2011, 1 page, [Online] [Retrieved on Mar. 31, 2011] Retrieved from the Internet <URL: http://www.iprint.com/cgi-shl/page_gen.cgi?sID=2011033111/921d2b2b101bea0d7b2-2&raw=aboutus%2Fprodandsvc>.

Schultz, R., "UPS Enters Postal Workshare Business," Direct, Penton Media, Inc., Apr. 26, 2001, 2 pages, [Online] [Retrieved on Sep. 27, 2010] Retrieved from the Internet <URL: http://directmag.com/news/marketing_ups_enters_postal/index.html>.

"Streamweaver for Print Stream Manipulation," Pitney Bowes Software, Inc., 2011, 1 page, [Online] [Retrieved on Mar. 31, 2011] Retrieved from the Internet <URL: http://www.pbinsight.com/products/customer-communication-mgmt/document-comp/print-stream-manipulation/streamweaver/>.

"UPS Mail Innovations," United Parcel Service of America, Inc., 1994-2010, 1 page, [Online] [Retrieved on Sep. 7, 2010] Retrieved from the Internet <URL: http://www.upsmailinnovations.com/>.

"Vistaprint: Company Background," Vistaprint, 2001-2010, 1 page, [Online] [Retrieved on Sep. 7, 2010] Retrieved from the Internet <URL: http://www.vistaprint.com/vp/ns/about/companybackground.aspx>.

* cited by examiner

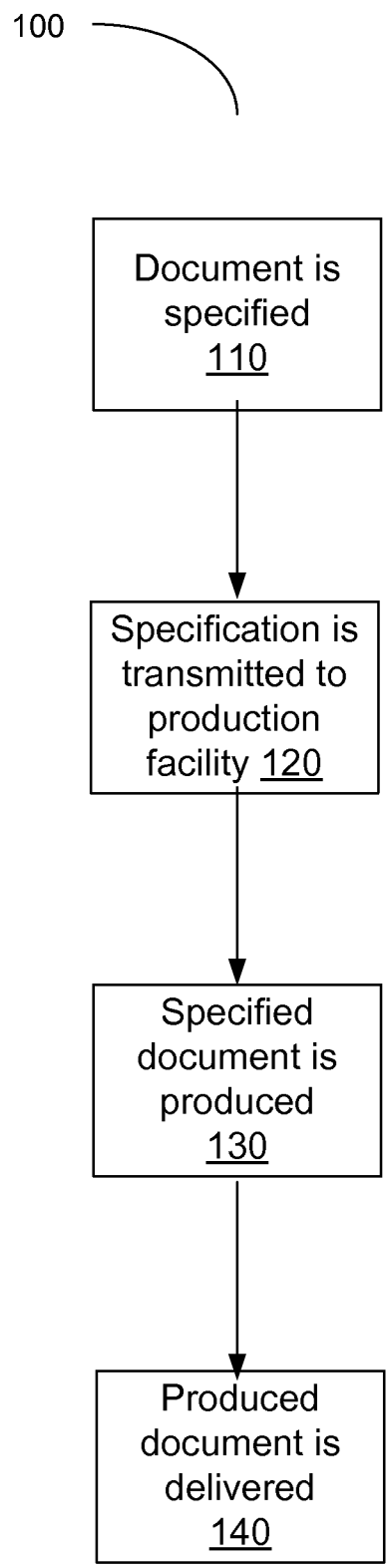

SPECIFYING, PRODUCING, AND DELIVERING VARIABLE-CONTENT DOCUMENTS

CROSS-REFERENCE TO RELATED APPLICATIONS

This application is a continuation of U.S. patent application Ser. No. 12/344,137, filed Dec. 24, 2008, entitled "Specifying, Producing, and Delivering Variable-Content Documents" which claims the benefit of U.S. Provisional Application No. 61/017,476, filed Dec. 28, 2007, entitled "Specifying, Producing, and Delivering Variable-Content Documents", both of which are incorporated by reference in their entirety. This application is related to U.S. Utility application Ser. No. 11/581,870, filed on Oct. 16, 2006, entitled "Dynamic Variable-Content Publishing" (now U.S. Pat. No. 8,438,476), which is incorporated by reference in its entirety.

BACKGROUND OF THE INVENTION

1. Field of the Invention

The present invention relates to creating different types of documents which can be distributed in different ways. More particularly, the present invention relates to a system that can be used to create and distribute different types of documents that are based on variable content and/or variable layout.

2. Description of Background Art

While businesses differ, one thing that they all have in common is the need for custom-produced business documents such as correspondence, contracts, transaction records, financial reports, legal disclosures, product announcements, press releases, sales proposals, marketing materials, memos or reports, account statements, invoices, and bills. Another commonality is that once these documents have been prepared, they must be delivered to the intended recipients. These business documents are almost always customized with information specific to a business such as the business' name, address, and logo. They also frequently contain content that must be changed or varied according to the specific recipient or group of recipients to which the document is directed. In its most basic form, this variable content may include such information as the recipients' address or contact data, but it may also include a wide range of other information that comprises the substance of the document and also alters or determines the form in which it is displayed or delivered.

Production and delivery of printed business documents is usually not the focus of a business. Instead, business owners want their employees to focus on serving customers and providing goods and services. Unfortunately, the handling of printed business documents can involve a great deal of time, expense, and aggravation. Consider, for example, what is required to produce a simple business letter:

First, letterhead stationery must be produced. This requires a letterhead to be printed onto first sheets, second sheets, and envelopes. Next, the letter must be composed and formatted to fit the first and second sheets, and the addressee information must be composed and formatted to fit the envelope. Then, a good printer is needed to print the first and second sheets and the envelope. Finally, delivery must be arranged. Note that this is an optimistic example. Things can get much more complicated when the letter contains typos, the envelope is incorrectly inserted into the printer, the printer is low on toner, the document must be delivered the next day, and the post office is closed. These familiar difficulties are compounded many times over when the document involved is more complex or involves illustrations, graphs or photographs, unusual page sizes, inserts or bindings, multiple languages, rush delivery, transnational delivery, or other special features.

SUMMARY OF THE INVENTION

Systems, methods, and computer program products are presented for creating and distributing a document of a particular type, where the document is based on variable content and/or variable layout. In one embodiment, a four-step is process is used. First, the document is specified. The document can be specified anywhere, regardless of the location of the user's office or the destination address of the document. In one embodiment, the document is specified using a client device (e.g., a computer running a web browser) that is attached to a network (e.g., the Internet). Second, the specification is transmitted to a production facility based on the destination address. Third, the document is produced at the facility. Finally, the produced document is delivered to the destination address.

BRIEF DESCRIPTION OF THE DRAWINGS

The invention is illustrated by way of example, and not by way of limitation, in the figures of the accompanying drawings in which like reference numerals refer to similar elements.

FIG. 1 illustrates a flowchart of a method for creating and distributing a document of a particular type, according to one embodiment of the invention.

DETAILED DESCRIPTION OF THE EMBODIMENTS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to an apparatus for performing the operations herein. This apparatus is specially constructed for the required purposes, or it comprises a general-purpose computer selectively activated or reconfigured by a computer program stored in the computer. Such a computer program is stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems are used with programs in accordance with the teachings herein, or more specialized apparatus are constructed to perform the required method steps. The required structure for a variety of these systems will appear from the description below. In addition, the present invention is not described with reference to any particular programming language. It will be appreciated that a variety of programming languages can be used to implement the teachings of the invention as described herein.

What is needed is a system that can enable a user to specify a printed business document and then have the document automatically produced and delivered without further user intervention. The system should be easy to use, affordable, and efficient. Also, the delivery of the document should be rapid.

A system called a "console" is used to create and distribute different types of documents, such as different types of documents that are based on variable content and/or variable layout. As used herein, the term "document" refers generally to any type of publication in any form, including (but not limited to) a piece of written, printed, or electronic matter that provides information or evidence; anything serving as a representation of a person's thinking by means of symbolic marks; writing that provides information (including information of an official nature); a formal piece of writing that provides information or acts as a record of events or arrangements; a writing conveying information; or a paper or set of papers with written or printed information, including of an official type. A document can comprise any type of substrate, including paper, plastic, and cloth.

Examples of a document include, but are not limited to, a magazine, newsletter, book, folder, letter, certificate, report, brochure, pamphlet, booklet, leaflet, catalog, publication, periodical, prospectus, circular, guide, handbook, workbook, manual, journal, register, volume, page(s), directory, declaration, manuscript, script, contract, testament, record, chart, dossier, material, questionnaire, query, survey, research, newssheet, communication, discourse, interview, narrative, tract, treatise, album, concordance, tome, epic, paperback, log, primer, textbook, annual, ledger, posting, spreadsheet, account, index, library, collection, series, print, edition, issue, tabloid, proof, composition, galley, layout, conveyance, instrument, and review.

In one embodiment, the console is used to create and distribute printed business documents such as letterhead stationery, business cards, memos or reports, invoices or bills (possibly self-mailing), flyers, brochures, proposals, postcards, newsletters, folders, books, boxes, labels, coupons, and signatures (11"×17", full-color, two-sided). In other embodiments, the process is used to create and distribute other types of documents.

A document is defined by two principal characteristics: content and layout. Content can include the broadest possible spectrum of text, numerical data, artwork, images, graphics, and symbols. Layout is generally defined as the spatial arrangement of content on a two-dimensional surface (such as a page). This two-dimensional surface can itself be arranged together with other such surfaces as part of a set of pages (such as a magazine or book). Page sets can be further arranged into sets of page sets (such as volumes), possibly including additional dependent elements such as covers, tables of contents, and indexes.

A console can create documents that are based on highly-variable content and/or highly-variable layout. For example, not only can the content on a page vary, but the number of pages in a book or volume and the number of books or volumes in a boxed set can also vary.

In one embodiment, the console uses algorithms or rules during various parts of the publishing process to substantially digitize and/or automate the process. For example, the creation and distribution of a document is generally accomplished by a team of people such as content creators, editors, customers (who ultimately purchase the document), and publishing supervisors. Since the document is generated algorithmically, it is embodied in electronic form. This means that a document can be accessed from various locations by various people over a network. Also, a person's access to a document can be restricted or customized based on her role in the publishing process. In one embodiment, a document (and/or its content elements) is encrypted during various phases of the publishing process so that it cannot be understood by unauthorized people.

In one embodiment, audit trails and/or archives are incorporated into the publishing process, including during the creation and/or distribution phases. Since the publishing process is electronic, logs can be automatically generated that reflect publishing operation and status. Every edit on every page can be tracked. Documents that are created can be archived and searched. Real-time reports, notifications, and alerts can be generated and sent automatically to users or other software applications. In one embodiment, a problem can be detected automatically and, depending on the circumstances, also corrected without requiring user intervention.

Workflow, approval, and accounting processes can also be integrated into the publishing process. In one embodiment, a user can track every stage of order fulfillment using an online interface. For example, literally every sheet of paper can be tracked from composition and creation to delivery to provide the user with a complete audit trail of document management. In one embodiment, this is achieved using tracking technologies such as barcodes and/or radio-frequency identification (RFID).

FIG. 1 illustrates a flowchart of a method for creating and distributing a document of a particular type, according to one embodiment of the invention. The method 100 includes four steps: a document is specified 110, the specification is transmitted 120 to a production facility, the specified document is produced 130, and the produced document is delivered 140. In one embodiment, steps 120 and 130 are fully automated. In addition, steps 110 and 140 are highly automated and require little manual input.

The first step, specifying 110 a document, involves determining a) information needed to produce the document ("production information") and b) information needed to deliver the document ("delivery information"). Production information includes, for example, the content and layout of the document. Delivery information includes, for example, the destination address and the target delivery date. Together, production information and delivery information (collectively referred to as a specification of a document) form an order for a customized document. The document can be customized based on, for example, the intended recipient of the document. Specifying a document in this manner can enable a finalized business document to be created in a matter of seconds instead of a matter of minutes.

In one embodiment, a user submits this information using a software application with a graphical user interface (GUI). The application can be specialized for this purpose or it can be a standard web browser. In one embodiment, the user accesses the software via a paid subscription to an online service. Note that the software interface can be used anywhere and at any time to specify documents and cause them to be produced and delivered. In one embodiment, the information is submitted using a client device (e.g., a computer running a web browser) that is attached to a network (e.g., the Internet).

In one embodiment, rather than expand the palette of choices a user has for composing, printing, and having a document delivered, the console does the opposite: it deliberately limits the choices available to the user. Such deliberate limitation provides a number of important advantages to the user. These advantages include assuring that such aspects of the document as its design, layout, and content are optimized in terms of such criteria as aesthetics (e.g., visual effectiveness, attractiveness), size (e.g., number of pages), usage of materials (e.g., amounts of specific inks, types of paper, types of envelopes), juxtaposition of content (e.g., some text and graphics on each page), production (e.g., speed of document printing, collation, approval), quality control (e.g., minimization of possible errors at any stage of composition, production, or delivery), and delivery (e.g., delivery speed and efficiency, delivery method, types of postage). By judiciously limiting user choice, the console can ensure that documents are composed, printed, and delivered significantly more efficiently and effectively than can users who are confronted by the bewildering number of choices usually afforded them when deciding to compose, print, and have a document delivered. In one aspect, the console is capable of operationalizing best practices and efficiencies—even ones that users would not have known to choose—to ensure the highest quality and efficiency of document composition, printing, and delivery.

Various tools are available to help the user submit the information. For example, a pre-loaded list of contacts includes various types of information such as customer name, company name, address, phone number, fax number, and email address. This information can be used as production information (e.g., to customize an envelope) and as delivery information (e.g., to specify where the letter will be sent). In one embodiment, the user can select various contacts (or groups of contacts) from the list to specify which contacts should receive a document.

In order to populate the contact list, information can be entered manually or imported from a wide variety of electronic sources such as Microsoft Outlook address books, Microsoft Excel spreadsheets, comma-delimited files, and various third-party contact database applications. Alternatively, the information can be obtained from a third party such as a list acquisition service. The contact list can be edited, amended, expanded, sorted, and/or exported at any time by the user. In one embodiment, a contact is annotated to indicate which document was sent to that contact and when.

As documents are created and saved over time, a document repository emerges that can be searched in order to find documents to re-use (with or without modifications). In one embodiment, these documents can also be used as templates (described below). Content can be organized and manipulated using content management tools.

Basic templates are provided for standard printed business documents and their layouts. More advanced templates can also be accessed for an additional fee. In one embodiment, a user is purposely limited to a relatively small set of templates that have been specially designed to work well and to create professional quality documents. Removing some choices and constraining the user in this way causes the end product business documents to be of a much higher quality.

In one embodiment, a template is a set of rules (e.g., conditions or definitions) governing the construction (e.g., design and/or layout, sizing and/or placement of content) of a document. In one embodiment, a template describes a document's header and footer, background, and/or body layout. A template can also describe a portion of a document, such as one page of the document or one portion of one page of the document. In one embodiment, multiple templates are used together to describe a particular type of document that is based on variable content and/or variable layout. One template can be used with different content pieces.

In one embodiment, if a particular type of information is indicated for use with a template (a "springing template"), the template automatically generates one or more related sections to be included in the document. These related sections can be either pre-filled or available for a user to populate. For example, consider a business letter template that contains two paragraphs. The user can choose one of two pre-written paragraphs to use as the first paragraph. The content of the second paragraph then changes depending on which pre-written paragraph the user chose to use as the first paragraph. In one embodiment, although the paragraphs are pre-written, they can still be edited by the user if desired.

In another embodiment, a template can automatically analyze a first content portion (e.g., text) and, based on that analysis, determine a second content portion to include (e.g., an image concerning a topic related to the text). In yet another embodiment, a template can automatically change a page's layout based on the characteristics of content (e.g., the size and shape of an image) that has been selected for inclusion in the page. In yet another embodiment, a template can automatically analyze the content of an image and change its operation accordingly.

Templates can be automatically populated using contact information and/or user-submitted text or artwork (e.g., a company logo). In order to be scalable, the artwork might be converted to vector format (if it wasn't already in that format). For example, a simple business letter template might automatically populate the following areas: the top center of the page (insert the business' logo as the letterhead), the area below that and to the left (insert the recipient's contact information as the destination address), and the area after the body of the letter (insert the user's name and contact information as the signature block). In one embodiment, recurring content associated with a particular template can be saved and assigned to the template so that the template is populated automatically if desired. If a template requires a piece of information that is missing, a user can be prompted to submit the information.

In one embodiment, a resource library includes pre-written, fully customizable business communications. For example, a pre-written collection letter can be chosen, where variable information includes the sender, recipient, amount due, etc. As another example, a pre-written follow-up sales letter can be chosen, which is useful after having made a sales call. Also, a pre-written "special offer" discount flyer can be chosen, where variable information includes the product and pricing information. In one embodiment, if a user customizes a document or a piece of content, that customization is stored and made available for use at a later time. If the stored customization is of general interest, it can be made available to both the user who created it and to other users.

In one embodiment, an online proof of the document being specified is available so that the user can review it and make any necessary changes.

After the user is satisfied with the delivery information and the production information (as reflected, for example, in the online proof), the user submits the customized document order and the method 100 moves to step 120. The user can also pay for the order online (e.g., via a credit/debit card or a pre-paid account).

The second step, transmitting 120 the specification to a production facility, involves sending an electronic version of the specification (i.e., the production information and delivery information) to a production facility. Then, the document is produced 130 at the facility according to the received specification.

In one embodiment (not shown), after a document has been specified 110, the specification is further processed before being transmitted 120 to a production facility. For example, the specification is processed to change the content of a document from one language to another. In one embodiment, a specification is automatically processed so that its content is translated into the language local to the destination address. In this way, specification 110 of a single document can result in the production of multiple documents, each in a different language, being delivered to different countries.

In another embodiment, only a portion of the specification is transmitted 120 to a production facility. In this embodiment, the production facility already has access to the rest of the specification. For example, if the specification uses a template, a copy of the template can be transmitted to the production facility ahead of time and stored for later use. This caching of data at the production facility decreases the size of the specification that needs to be transmitted.

In yet another embodiment (also not shown), a different type of electronic description of a document can be transmitted to a production facility. In this embodiment, the electronic description would differ from the "specification" mentioned above. Instead, the electronic description would adhere to a standard document format such as Word from Microsoft, Portable Document Format from Adobe, or PostScript from Adobe. In one embodiment, an Application Program Interface (API) is used to access the capabilities of a production facility, and the electronic description is processed before it is transmitted to the production facility (e.g., to put the description in a format that can be understood by the machines at the facility). In another embodiment, the system of production facilities appears to the user as a "printer" that can be selected to print a particular document (e.g., from within a software application such as Microsoft Word).

In one embodiment, more than one production facility exists that is capable of producing the specified document. For example, each facility has the requisite machines and materials (paper, ink, etc.). All of the facilities might be identical in terms of capabilities. Alternatively, some facilities might offer different capabilities. If multiple capable facilities exist, transmitting 120 the specification and producing 130 the document follows a "distribute-and-print" model in order to select a facility to produce the document.

In one embodiment, the distribute-and-print model calls for the production facility to be selected based on the destination address. Recall that the destination address is part of the delivery information portion of the specification of the document. Transmitting a document electronically towards its destination before producing the document saves a lot of time and expense. Also, this allows for more efficient use of postal-route sorting in order to achieve savings for delivery charges. Production facilities can be widely scattered geographically in order to increase the efficiency of document delivery to any geographic area. Different metrics can be used for the facility selection, as follows: (Note that multiple metrics can be combined to form an overall metric that is then used to select a facility.)

Geographical distance—In one embodiment, the specification is transmitted 120 electronically to the production facility that minimizes the geographical distance between the facility and the destination address.

Delivery cost—In another embodiment, the specification is transmitted 120 electronically to the production facility that minimizes the cost for delivering the printed document from that facility to the destination address. This facility may or may not be the facility that minimizes the geographical distance, based on postal zones and rates.

Delivery time—In yet another embodiment, the specification is transmitted 120 electronically to the production facility that minimizes the time required to deliver the printed document from that facility to the destination address. This facility may or may not be the facility that minimizes the geographical distance and/or the facility that minimizes the delivery cost.

In another embodiment, the distribute-and-print model calls for the production facility to be selected based on the characteristics of the facility. Different metrics can be used for the selection, as follows: (Note that multiple metrics can be combined to form an overall metric that is then used to select a facility.)

Unused capacity—In one embodiment, the specification is transmitted 120 electronically to the production facility that has the largest unused capacity. The effect would be balancing the work loads among the different facilities.

Labor cost—In one embodiment, the specification is transmitted 120 electronically to the production facility that has the lowest labor cost. This would be useful, for example, if producing the document were labor-intensive.

The third step, producing 130 the specified document, involves generating the document in tangible form based on the received specification. In one embodiment, machines at the selected production facility modify (e.g., print on) various kinds of physical, hard copy materials (plain, glossy, transparent, etc.) to produce the specified document. In one embodiment, these materials are subjected to various finishing processes such as cutting, folding, boxing, and labeling. The materials can be used in different ways to organize and assemble the document (e.g., box, book cover and contents, folder cover and contents, booklet, and label). In one embodiment, instructions regarding how to "finish" a job are included in one or more job tickets. A job ticket can include a barcode that, once scanned, indicates that the instructions on the job ticket have been performed successfully. In this way, the status of the finishing process can be tracked and viewed online.

The fourth step, delivering 140 the produced document, involves mailing, shipping, or otherwise moving the produced (tangible) document from the selected production facility, where it was produced, to the destination address. Delivery can include using the services of a public post office, a commercial carrier, a courier or messenger service, etc. In most situations, the facility at which a document is produced is close enough to the destination address for the document to reach its destination with overnight delivery or perhaps even the same day.

What is claimed is:

1. A computer program product for creating a variable-content document, comprising:
   a non-transitory machine-readable medium encoded with instructions which, when executed by a processor, cause the processor to perform a method, the method comprising:
      receiving a specification of the document, wherein the specification comprises production information and delivery information, and wherein the production information indicates document content and document layout, and wherein the delivery information indicates a destination address;
      determining a set of production facilities, wherein each production facility in the set is capable of producing the document;
      determining, for each of a plurality of production facilities within the set, a corresponding metric value quantifying a suitability of the production facility for performing a delivery to the destination address, wherein the metric value is based at least in part on a measure of a labor cost specific to the production facility for producing the document;
      selecting, from the production facilities based on the corresponding metric values, a production facility; and
      transmitting the specification to the selected production facility.

2. The computer program product of claim 1, wherein the metric value corresponding to a production facility is based at least in part on a geographical distance between the production facility and the destination address.

3. The computer program product of claim 1, wherein the metric value corresponding to a production facility is based at least in part on a monetary delivery cost from the production facility to the destination address.

4. The computer program product of claim 1, wherein the metric value corresponding to a production facility is based at least in part on a delivery time from the production facility to the destination address.

5. The computer program product of claim 1, wherein the metric value corresponding to a production facility is based at least in part on a particular characteristic of the production facility.

6. The computer program product of claim 5, wherein the particular characteristic of the production facility comprises a measure of an unused capacity of the production facility.

7. The computer program product of claim 1, wherein the document content is written in a first natural language, and wherein the method further comprises:
   identifying a second natural language local to the destination address; and
   automatically translating the document content to the second natural language, prior to transmitting the specification to the selected production facility.

8. A computer program product for specifying a variable-content document, comprising:
   a non-transitory machine-readable medium encoded with instructions which, when executed by a processor, cause the processor to perform a method, the method comprising:
      offering a plurality of choices for a characteristic of the document, wherein the choices optimize a quality of the document;
      receiving one choice from the plurality of choices;
      based on the received choice, generating a specification of the document, wherein the specification comprises production information and delivery information, and wherein the production information indicates document content and document layout, and wherein the delivery information indicates a destination address;
      applying a template to the specification; and
      responsive to a change in characteristics of the document content, the template automatically changing the document layout.

9. The computer program product of claim 8, wherein the characteristic of the document comprises a design of the document or a layout of the document or a content of the document.

10. The computer program product of claim 8, wherein the quality of the document is based on one or more elements of a group containing aesthetics, size, usage of materials, juxtaposition of content, production, quality control, and delivery.

11. A system for creating a variable-content document, comprising:
   a non-transitory machine-readable medium encoded with instructions for:
      receiving a specification of the document, wherein the specification comprises production information and delivery information, and wherein the production information indicates document content and document layout, and wherein the delivery information indicates a destination address;
      determining a set of production facilities, wherein each production facility in the set is capable of producing the document;
      determining, for each of a plurality of production facilities within the set, a corresponding metric value quantifying a suitability of the production facility for performing a delivery to the destination address, wherein the metric value is based at least in part on a measure of a labor cost specific to the production facility for producing the document;
      selecting, from the production facilities based on the corresponding metric values, a production facility; and
      transmitting the specification to the selected production facility; and
   a processor for executing the instructions.

12. The system of claim 11, wherein the metric value corresponding to a production facility is based at least in part on a geographical distance between the production facility and the destination address.

13. The system of claim 11, wherein the metric value corresponding to a production facility is based at least in part on a monetary delivery cost from the production facility to the destination address.

14. The system of claim 11, wherein the metric value corresponding to a production facility is based at least in part on a delivery time from the production facility to the destination address.

15. The system of claim 11, wherein the metric value corresponding to a production facility is based at least in part on a particular characteristic of the production facility.

16. The system of claim 15, wherein the particular characteristic of the production facility comprises a measure of an unused capacity of the production facility.

17. The system of claim 11, wherein the document content is written in a first natural language, and wherein the non-transitory machine-readable medium is further encoded with instructions for:
   identifying a second natural language local to the destination address; and
   automatically translating the document content to the second natural language, prior to transmitting the specification to the selected production facility.

18. A system for specifying a variable-content document, comprising:
   a non-transitory machine-readable medium encoded with instructions for:
      offering a plurality of choices for a characteristic of the document, wherein the choices optimize a quality of the document;
      receiving one choice from the plurality of choices;
      based on the received choice, generating a specification of the document, wherein the specification comprises production information and delivery information, and wherein the production information indicates document content and document layout, and wherein the delivery information indicates a destination address;
      applying a template to the specification; and
      responsive to a change in characteristics of the document content, the template automatically changing the document layout; and
   a processor for executing the instructions.

19. The system of claim 18, wherein the characteristic of the document comprises a design of the document or a layout of the document or a content of the document.

20. The system of claim 18, wherein the quality of the document is based on one or more elements of a group containing aesthetics, size, usage of materials, juxtaposition of content, production, quality control, and delivery.

\* \* \* \* \*

UNITED STATES PATENT AND TRADEMARK OFFICE
CERTIFICATE OF CORRECTION

| | | |
|---|---|---|
| PATENT NO. | : 8,743,406 B1 | Page 1 of 1 |
| APPLICATION NO. | : 13/904307 | |
| DATED | : June 3, 2014 | |
| INVENTOR(S) | : Mark A. Uhlig | |

It is certified that error appears in the above-identified patent and that said Letters Patent is hereby corrected as shown below:

Title page, item (57) Abstract, line 4: replace "a four-step is process is" with --a four-step process is--.

Signed and Sealed this
Seventh Day of July, 2015

Michelle K. Lee
*Director of the United States Patent and Trademark Office*